Patented Nov. 13, 1928.

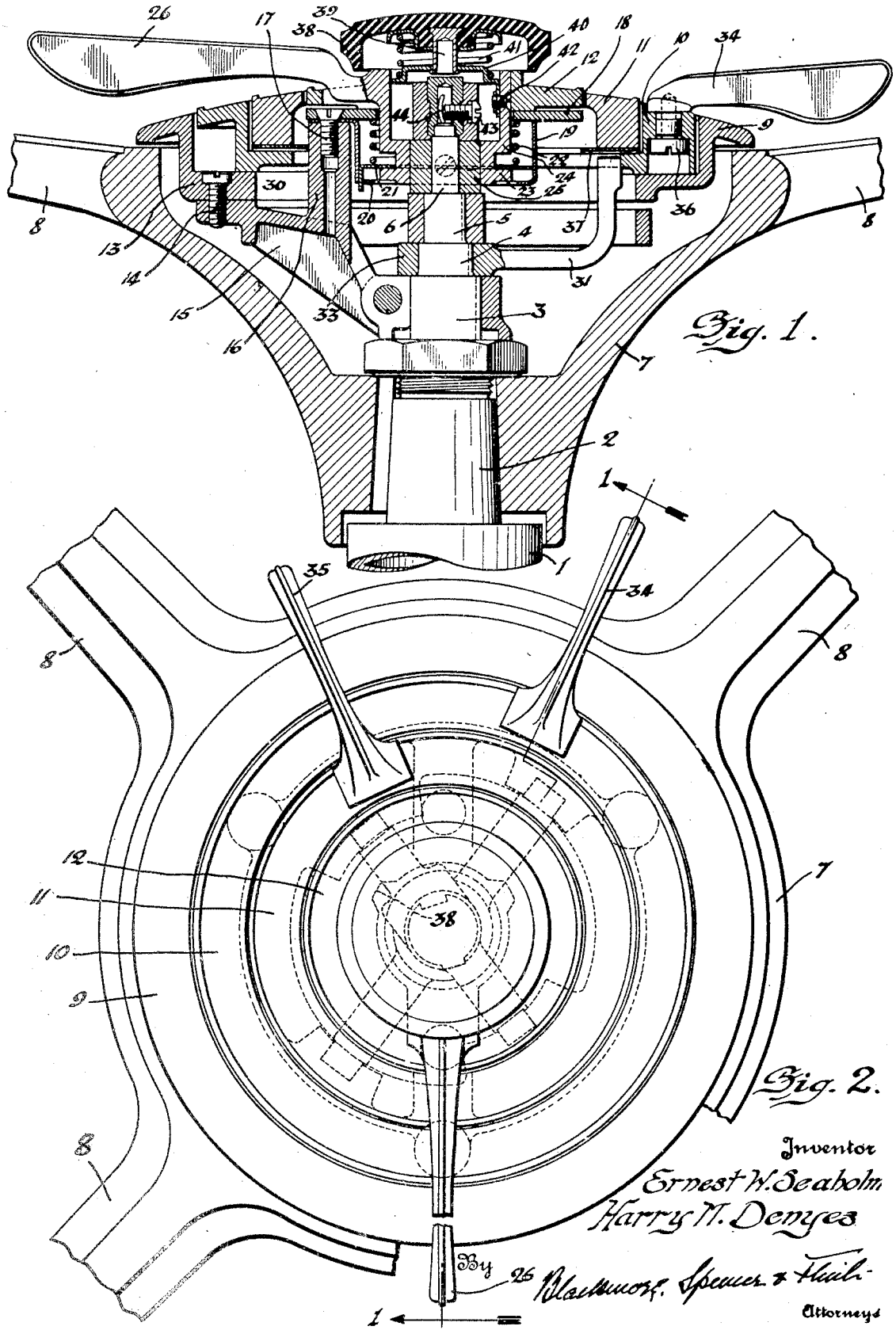

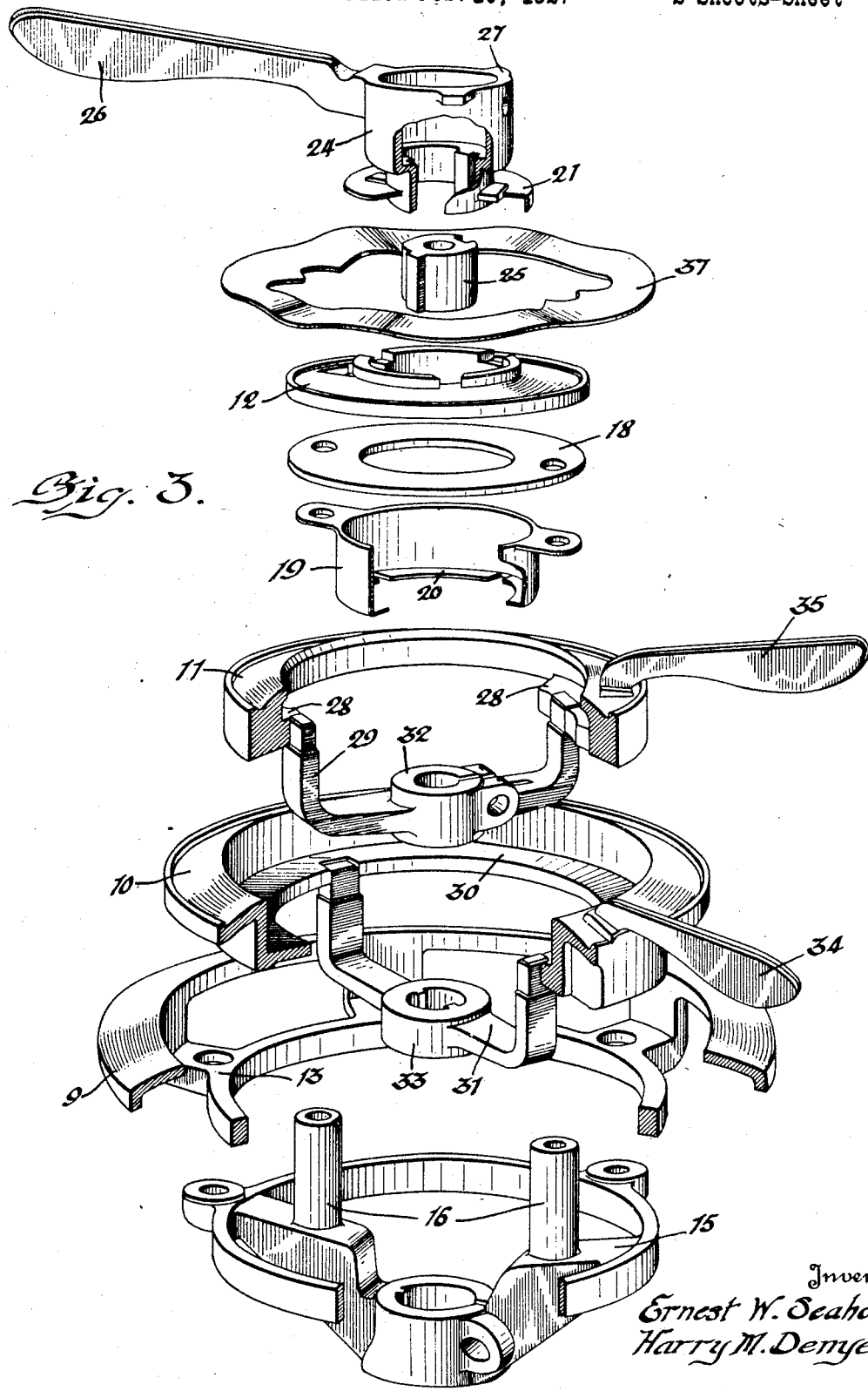

1,691,139

UNITED STATES PATENT OFFICE.

ERNEST W. SEAHOLM, OF DETROIT, AND HARRY M. DENYES, OF SAGINAW, MICHIGAN, ASSIGNORS TO GENERAL MOTORS CORPORATION, OF DETROIT, MICHIGAN, A CORPORATION OF DELAWARE.

STEERING-WHEEL-CONTROL ASSEMBLY.

Application filed February 10, 1927. Serial No. 167,247.

This invention relates to a steering wheel control assembly for motor vehicles and the like, wherein the steering column consists of a plurality of nested tubes with hand actuated control levers at the top of the column.

One of the objects of the invention is to provide an easily accessible group of control elements, located at the hub of the steering wheel in a compact arrangement, and which will be simple and economical to manufacture, of improved appearance, and unlikely to get out of order.

A further object of the invention is to provide a series of relatively movable, circular recessed plates, nested one within the other in concentric succession, the tops of the several plates merging with each other to form a comparatively flat top or cover over the center or hub of the steering wheel.

Other objects will be apparent from the following description of a preferred embodiment of the invention, illustrated in the accompanying drawings, in which Figure 1 is a vertical sectional view of the steering wheel control assembly taken on line 1—1 of Figure 2;

Figure 2 is a top plan view of the steering wheel;

Figure 3 is a detail perspective view of the several parts of the control unit, disassembled.

Referring to the drawing, the steering column consists of a housing 1, enclosing a plurality of internested tubular shafts. In the present instance, these shafts include a steering shaft 2, a stationary supporting shaft 3, a carburetor throttle control shaft 4, a spark or ignition control shaft 5 and the head light control shaft 6. The last mentioned shaft may be arranged to control a rotary switch at the lower end of the column, or if desired it may be arranged to actuate the well known tilting lamps.

Mounted on the upper end of the shaft 2 is the hollow hub 7, having radial spider arms 8, connected with a steering wheel rim as is usual. A cover or face plate for the hub of the steering wheel is provided in the form of a plurality of annular recessed plates or rings 9, 10, 11 and 12, arranged one within another in concentric succession, the upper surfaces of which merge or coincide with each other to form a comparatively flat top. The drawing shows the top as being slightly convex, and it is to be understood that the particular shape or surface contour may be more or less varied to lend a certain ornamental or pleasing appearance to the control unit. The several rings lie within the recesses and are supported upon the inwardly projecting ledges or flanges of successive rings. The ledge or flange 13 of the ring 9, is secured by screws 14 to the bracket member 15, housed within the hollow hub, and having a central split hub portion clamped on the upper end of the stationary tube 3, whereby the outermost ring 9 is held stationary.

Integrally formed on the stationary bracket 15, are a pair of upstanding bosses or studs 16, to which are attached by screws 17, a retainer ring or collar 18, and a cup shaped stamping 19 having a lateral flange portion 20. A second stamping or disc 21 has a number of dependent interlocking tongues or ears, projecting through notches or slots in the flange 20, and a spring 22 between the disc 21 and collar 18 exerts its tension on the disc 21 to cause it to frictionally bear upon a number of lateral bosses or ledges 23, carried on the exterior of a rotatable sleeve or hub 24, extending downwardly through the collar 18. The sleeve 24 is attached by a tongue and groove connection to the interior collar 25, fixedly carried by the innermost tubular shaft 6. Projecting radially from the upper end of the sleeve 24, and through an opening in the innermost ring 12, is an actuating lever 26, which governs the rotation of the light control shaft 6. Lugs or bosses 27 on the top of the sleeve 23 engage within notches in an upstanding flange of the ring 12, to carry the ring throughout the movement of the sleeve.

The ring 12 overhangs and rests upon a pair of oppositely disposed flanges 28 on the ring 11, and a pair of upstanding arms of a bracket or driver 29 fit within notches in the flanges 28. The ring 11 in turn, is supported by the annular flange or ledge 30 of the ring 10, which also is provided with a pair of opposite notches or grooves into which fit the upstanding arms of the bracket or driver 31. The hubs 32 and 33 of the brackets 29 and 31 are respectively attached to the tubular shafts 4 and 5, the hub 33 being shown provided with tongues, which are adapted to be slid into grooves in the end of the tube 4', while the hub 32 is slotted and has apertured ears for insertion of a screw stud to contract or draw the head into clamping engagement with the shaft 5. Actuating levers 34 and 35 are secured respectively to the rings 10 and 11 by means of a screw stud 36 extending upwardly from the bottom of each ring. In order to maintain the rings in adjusted positions a spring ring 37, consisting of a circular plate of spring material, having a number of depressions, is inserted between the rings 10 and 11, and offers frictional resistance to their relative movement. It will be apparent that the coil spring 22, in addition to offering frictional resistance to the movement of the light control lever, also maintains the several recessed rings nested one within another, and the stationary bracket therefore, serves to both support the rings and hold them against disassembly.

At the center of the control unit is preferably provided a depressible horn button or cap 38, having a stud or pin 39 extending through a retainer plate or disc 40, for the helical coil spring 41, the plate 40 having a suitable number of dependent ears or tongues secured to the sleeve 24 by screws 42. Current conducting wire or cable extends through the innermost tube 6 and is attached by the stud 43 to a contact element 44.

Thus the hollow steering wheel hub serves to house the control assembly unit and the arrangement of relatively movable internested concentric rings provides a cover for the hub of pleasing appearance.

While the invention has been described more or less specifically, it is to be understood that such obvious modification may be made as come within the scope of the appended claims.

Having described our invention we claim:

1. A steering wheel control assembly including a steering wheel, and a plurality of relatively movable control rings located on the hub of the wheel, and having their peripheral edges disposed one beyond another, in concentric succession.

2. A steering wheel control assembly, including a steering column, a steering wheel and a control unit located on the hub of the wheel, consisting of a plurality of concentric annular rings located one within another and relatively movable.

3. A steering wheel control assembly, including a steering column, a steering wheel and a control unit located on the hub of the wheel, consisting of a plurality of concentric annular rings located one within another and relatively movable, and means to frictionally resist relative movement of said rings.

4. A steering wheel control assembly including a steering column, a plurality of concentric nested rings mounted on the column for relative rotation, and members within said column operatively associated with said rings.

5. A steering column assembly comprising a plurality of relatively movable nested tubular shafts, and a plurality of annular control rings arranged one within another and respectively connected with said tubular shafts.

6. A steering column assembly including a plurality of nested tubular control shafts, bracket arms clamped to the upper ends thereof and extending radially and upwardly at different distances from the axis of the shafts, and a plurality of nested recessed plates operatively engaged by said arms, and having upstanding rims which coincide with each other to form a comparatively flat upper surface.

7. A steering wheel control assembly including a plurality of relatively movable nested tubular shafts, brackets projecting upwardly from the extremities of the shafts and a plurality of annular rings carried by said brackets and arranged one within the other and having their top surfaces merging with one another.

8. A steering wheel control assembly, including a steering column, a plurality of rotative elements carried by the column having their upper surfaces merging with each other.

9. A steering wheel control assembly including a steering wheel, a plurality of relatively movable rings associated with said wheel and, nested one within another and having their top surfaces merging with each other to form a plate-like member.

10. A steering wheel control assembly including a plurality of nested tubular shafts, a steering wheel mounted on one of the shafts, a control unit at the hub of the wheel, including a plurality of concentric nested rings operatively associated with said plurality of tubular shafts, and having their upper surfaces merging with each other to form a plate like hub cover.

11. A steering wheel control assembly including a plurality of nested tubular shafts, a steering wheel mounted on one of the shafts, a control unit at the hub of the wheel, including a plurality of concentric nested rings operatively associated with said plurality of tubular shafts, and having their upper surfaces merging with each other to form a plate-like hub cover and inwardly projecting ledges on the rings, each to respectively support the next succeeding ring.

12. A steering column assembly comprising a plurality of relatively movable nested tubular shafts, a steering wheel mounted on one of the shafts, a control unit positioned at the hub of the wheel including a plurality of concentric nested annular rings provided with portions which overlap next succeeding rings, brackets respectively connecting each ring with one of said tubular shafts and means associated with one of the brackets to prevent disassembly of the rings.

13. A steering wheel control assembly including a steering wheel, a control unit on the hub of the wheel, consisting of a plurality of concentric nested rings, one of said rings being a stationary supporting ring, the remaining rings being relatively movable and supported by the stationary ring.

14. A steering column assembly comprising a plurality of nested tubular shafts, a steering wheel mounted on one of the shafts, a control unit in the hub of the wheel including a plurality of concentric nested rings, having overlapping portions, the outer ring being mounted on a stationary tube and the inner rings being operatively associated with rotative shafts, actuating levers carried by the respective inner rings, and means carried by the stationary shaft to maintain the inner rings in assembled relation.

15. A steering wheel control assembly, including a plurality of nested tubular shafts, a steering wheel mounted on one of the shafts, a control unit at the hub of the wheel including a plurality of concentric annular rings, one of the rings being secured to a stationary shaft and adapted to support the remaining rings, the supported rings being operatively connected with rotable shafts of said plurality, and actuating levers carried by said rings.

16. A steering wheel control assembly, including a plurality of nested tubular shafts, a steering wheel mounted on one of the shafts, a control unit at the hub of the wheel including a plurality of concentric annular rings, having their upper surfaces merging with each other to present a plate like hub cover, the outermost ring being secured to a stationary shaft and having an inwardly projecting ledge to support the inner rings, said inner rings being relatively movable and operatively connected with rotatable shafts, and means to frictionally resist the movement of said rings.

17. A steering wheel control assembly, including a plurality of nested tubular shafts, a steering wheel mounted on one of the shafts, a control unit at the hub of the wheel including a plurality of concentric annular rings, having their upper surfaces merging with each other to present a plate-like hub cover, the outermost ring being secured to a stationary shaft and having an inwardly projecting ledge to support the inner rings, said inner rings being relatively movable and operatively connected with rotatable shafts, and means carried by the stationary shaft, associated with the innermost ring to maintain the inner rings in assembled relation and on the supporting ledge of said outer ring.

18. A steering column assembly comprising a plurality of nested tubular shafts, one of which is stationary, a steering wheel mounted on one of the shafts and having a hollow hub, a control unit in the hub including a plurality of relatively movable concentric nested annular rings provided with portions which overlap next succeeding rings, a bracket within said hub fixedly connecting the outer ring of said plurality to the stationary tube, a sleeve associated with the inner ring and mounted on one of the shafts, brackets carried by remaining tubular shafts and detachably connected respectively to the intermediate rings, a retainer member for said sleeve, carried by the fixed bracket, spring means interposed between the retained member and sleeve and spring means interposed between the intermediate rings, said spring means offering frictional resistance to the relative movement of the rings.

19. In a steering column assembly, the combination of a tubular steering shaft, a steering wheel secured to said shaft and having a hollow hub, a stationary supporting tubular shaft disposed within the steering shaft, a plurality of rotatable shafts internested within said stationary tubular shaft, a control unit forming a cover plate for the top of the hub and consisting of a plurality of relatively movable internested rings and operative connections between the respective rings and shafts, housed within said hollow hub.

In testimony whereof we affix our signatures.

ERNEST W. SEAHOLM.
HARRY M. DENYES.